(12) United States Patent
Nagasaki

(10) Patent No.: US 8,751,471 B2
(45) Date of Patent: Jun. 10, 2014

(54) DEVICE, SYSTEM, METHOD AND COMPUTER READABLE MEDIUM FOR INFORMATION PROCESSING

(75) Inventor: Takeshi Nagasaki, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 538 days.

(21) Appl. No.: 12/405,199

(22) Filed: Mar. 16, 2009

(65) Prior Publication Data

US 2009/0240673 A1 Sep. 24, 2009

(30) Foreign Application Priority Data

Mar. 21, 2008 (JP) ................................ 2008-073018

(51) Int. Cl.
*G06F 17/30* (2006.01)

(52) U.S. Cl.
USPC .......................................... 707/706; 379/1.02

(58) Field of Classification Search
CPC .............. H04M 1/6505; G10L 15/265; G10L 2015/088; G06Q 30/02; G06Q 10/107; G06Q 30/0269; G06Q 40/04; G06Q 10/06; H04L 29/12594; H04L 29/12066; H04L 61/1511; H04L 61/3015; H04L 12/1813; H04L 12/581; H04L 29/12132; H04L 51/04; H04L 61/1552
See application file for complete search history.

(56) References Cited

U.S. PATENT DOCUMENTS

| 2002/0051530 | A1 | 5/2002 | Sato et al. |
| 2004/0189791 | A1* | 9/2004 | Haruki ........................ 348/14.01 |
| 2007/0048715 | A1* | 3/2007 | Miyamoto et al. ............ 434/308 |
| 2008/0040113 | A1* | 2/2008 | Onodera et al. ............. 704/251 |
| 2008/0144788 | A1* | 6/2008 | You et al. ................... 379/93.15 |

FOREIGN PATENT DOCUMENTS

| JP | S63-027898 A | 2/1988 |
| JP | S63-137326 A | 6/1988 |
| JP | H07-303143 A | 11/1995 |
| JP | H09-46428 A | 2/1997 |
| JP | H11-275214 A | 10/1999 |
| JP | 2000-078530 A | 3/2000 |
| JP | 2002-077412 A | 3/2002 |
| JP | 2002-135430 A | 5/2002 |
| JP | 2002-183169 A | 6/2002 |
| JP | 2002-199128 A | 7/2002 |
| JP | 2005-012339 A | 1/2005 |
| JP | 2007-286701 A | 11/2007 |
| JP | 2008-021051 A | 1/2008 |

OTHER PUBLICATIONS

Japan Patent Office; Notification of Reasons of Rejection in Japanese Patent Application No. 2008-073018 (counterpart to the above captioned US application) mailed May 11, 2010.

\* cited by examiner

*Primary Examiner* — Dinku Gebresenbet
(74) *Attorney, Agent, or Firm* — Baker Botts L.L.P.

(57) ABSTRACT

There is provided an information processing system comprising a device and a terminal. The device comprises a recording unit to record telephone communication; a voice obtaining unit to obtain voice in response to detection of disconnection from a phone line; a transmission unit to transmit recorded data; a transmission unit to transmit voice data; a reception unit to receive a keyword candidate; a display control unit to display the keyword candidate; a selection unit to select a keyword candidate; and a transmission unit to transmit the selected keyword candidate. The terminal comprises a reception unit to receive the recorded data; a keyword generation unit to generate the keyword candidate based on the voice data; a transmission unit to transmit the keyword candidate; a registration unit to register the keyword candidate as a search keyword while associating the keyword candidate with the recorded data.

13 Claims, 6 Drawing Sheets

DEVICE, SYSTEM, METHOD AND COMPUTER READABLE MEDIUM FOR INFORMATION PROCESSING

CROSS-REFERENCE TO RELATED APPLICATION

This application claims priority under 35 U.S.C. §119 from Japanese Patent Application No. 2008-073018, filed on Mar. 21, 2008. The entire subject matter of the application is incorporated herein by reference.

BACKGROUND

1. Technical Field

Aspects of the present invention relate to an information processing system for managing recorded data generating by recording a telephone communication while using a search keyword.

2. Related Art

Conventionally, a voice recording device configured to automatically record a telephone communication (i.e., phone conversation) has been widely used. Japanese Patent Provisional Publication No. HEI 9-46428A (hereafter, referred to as JP HEI 9-46428A) discloses an example of such a voice recording device. The voice recording device disclosed in JP HEI 9-46428A stores the recorded data in a mail box.

SUMMARY

If a total number of pieces of recorded data becomes large, it is preferable to form a database in which the pieces of recorded data are associated with search keywords, respectively. In this case, the user is able to find desired recorded data from among the plurality of pieces of recorded data through keyword searching.

However, in order to register the recorded data in the data base while associating a search keyword with the recorded data, a user needs to input a command for starting connection to a terminal after disconnection from a phone line, to select recorded data to which a search keyword should be assigned, and to input a search keyword to the device.

Aspects of the present invention are advantageous in that at least one of a device, system, method and computer readable medium capable of reducing a load on a user when the user registers recorded data while associating a search keyword with the recorded data is provided.

According to an aspect of the invention, there is provided an information processing system, comprising: a device having a telephone function; and a terminal communicatably connected to the device. The device comprises: a recording unit configured to record telephone communication conducted through the telephone function; a voice obtaining unit configured to obtain voice externally in response to detection of disconnection from a phone line; a first transmission unit configured to transmit recorded data which is recorded by the recording unit, to the terminal; a second transmission unit configured to transmit voice data obtained by the voice obtaining unit to the terminal; a device side reception unit configured to receive keyword candidate data from the terminal; a display control unit configured to display the received keyword candidate data; a selection unit configured to select at least one keyword candidate from among the displayed keyword candidate data; and a third transmission unit configured to transmit the selected at least one keyword candidate to the terminal. The terminal comprises: a terminal side reception unit configured to receive the recorded data from the device; a keyword generation unit configured to generate the keyword candidate data based on the voice data received from the device; a terminal side transmission unit configured to transmit the generated keyword candidate data to the device; a registration unit configured to register the at least one keyword candidate received from the device in a content database as a search keyword for searching for the recorded data while associating the received at least one keyword candidate with the recorded data in the content database.

With this configuration, the information processing system generates and displays keyword candidates based on the voice inputted by the user in response to detection of disconnection from the phone line. The information processing system records at least one keyword candidate designated by the user, as a search keyword for the recorded data. The system automatically obtains the user's voice in response to detection of disconnection from the phone line. Therefore, first, the system eliminates the need for the user operation for connecting the device to the terminal. Second, the system eliminates the need for user operation until a keyword is presented to the user. That is, the system does not need the user operation during a period between disconnection from the phone line and presenting of the keyword to the user.

When the system detects disconnection from the phone line, the system is able to transmit the keyword subsequently to transmission of the recorded data, and to register the keyword and the recorded data while associating the keyword with the recorded data. Therefore, the user easily understands which of the recorded data is associated with the keyword. The system is also able to prevent a search keyword from being erroneously assigned to unintended recorded data.

Therefore, it is possible to reduce the operating load on the user when the user registers recorded data of a telephone communication in association with a search keyword.

According to another aspect of the invention, there is provided an information processing system, comprising: a device having a telephone function. The device comprising: a recording unit configured to record telephone communication conducted through the telephone function; a voice obtaining unit configured to obtain voice externally in response to detection of disconnection from a phone line; a first transmission unit configured to transmit recorded data which is recorded by the recording unit; a second transmission unit configured to transmit voice data obtained by the voice obtaining unit; a device side reception unit configured to receive keyword candidate data; a display control unit configured to display the received keyword candidate data; a selection unit configured to select at least one keyword candidate from among the displayed keyword candidate data; and a third transmission unit configured to transmit the selected at least one keyword candidates. The information processing system further comprises: a target side reception unit configured to receive the recorded data from the device; a keyword generation unit configured to generate the keyword candidate data based on the voice data received from the device; a target side transmission unit configured to transmit the generated keyword candidate data to the device; a registration unit configured to register the at least one keyword candidate received from the device in a content database as a search keyword for searching for the recorded data while associating the received at least one keyword candidate with the recorded data in the content database.

With this configuration, it is possible to reduce the operating load on the user when the user registers recorded data of a telephone communication in association with a search keyword.

According to another aspect of the invention, there is provided an information processing device having a telephone function, comprising: a recording unit configured to record telephone communication conducted through the telephone function; a voice obtaining unit configured to obtain voice externally in response to detection of disconnection from a phone line; a keyword generation unit configured to generate keyword candidate data based on the voice data; a display control unit configured to display the keyword candidate data; a selection unit configured to select at least one keyword candidate from among the displayed keyword candidate data; and a registration unit configured to register the at least one keyword candidate selected through the selection unit in a content database as a search keyword for searching for the recorded data while associating the at least one keyword candidate with the recorded data in the content database.

With this configuration, it is possible to reduce the operating load on the user when the user registers recorded data of a telephone communication in association with a search keyword.

According to another aspect of the invention, there is provided a method to be implemented on an information processing device having a telephone function, comprising the steps of: recording telephone communication conducted through the telephone function; obtaining voice externally in response to detection of disconnection from a phone line; generating keyword candidate data based on the voice data; displaying the keyword candidate data; selecting at least one keyword candidate from among the displayed keyword candidate data; and registering the selected at least one keyword candidate in a content database as a search keyword for searching for the recorded data while associating the at least one keyword candidate with the recorded data in the content database.

With this configuration, it is possible to reduce the operating load on the user when the user registers recorded data of a telephone communication in association with a search keyword.

According to another aspect of the invention, there is provided a computer readable medium having computer readable instruction stored thereon, which, when executed by a processor of an information processing device having a telephone function, configures the processor to perform the steps of: recording telephone communication conducted through the telephone function; obtaining voice externally in response to detection of disconnection from a phone line; generating keyword candidate data based on the voice data; displaying the keyword candidate data; selecting at least one keyword candidate from among the displayed keyword candidate data; and registering the selected at least one keyword candidate in a content database as a search keyword for searching for the recorded data while associating the at least one keyword candidate with the recorded data in the content database.

With this configuration, it is possible to reduce the operating load on the user when the user registers recorded data of a telephone communication in association with a search keyword.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, an embodiment according to the invention will be described with reference to the accompanying drawings.

Figure 1:
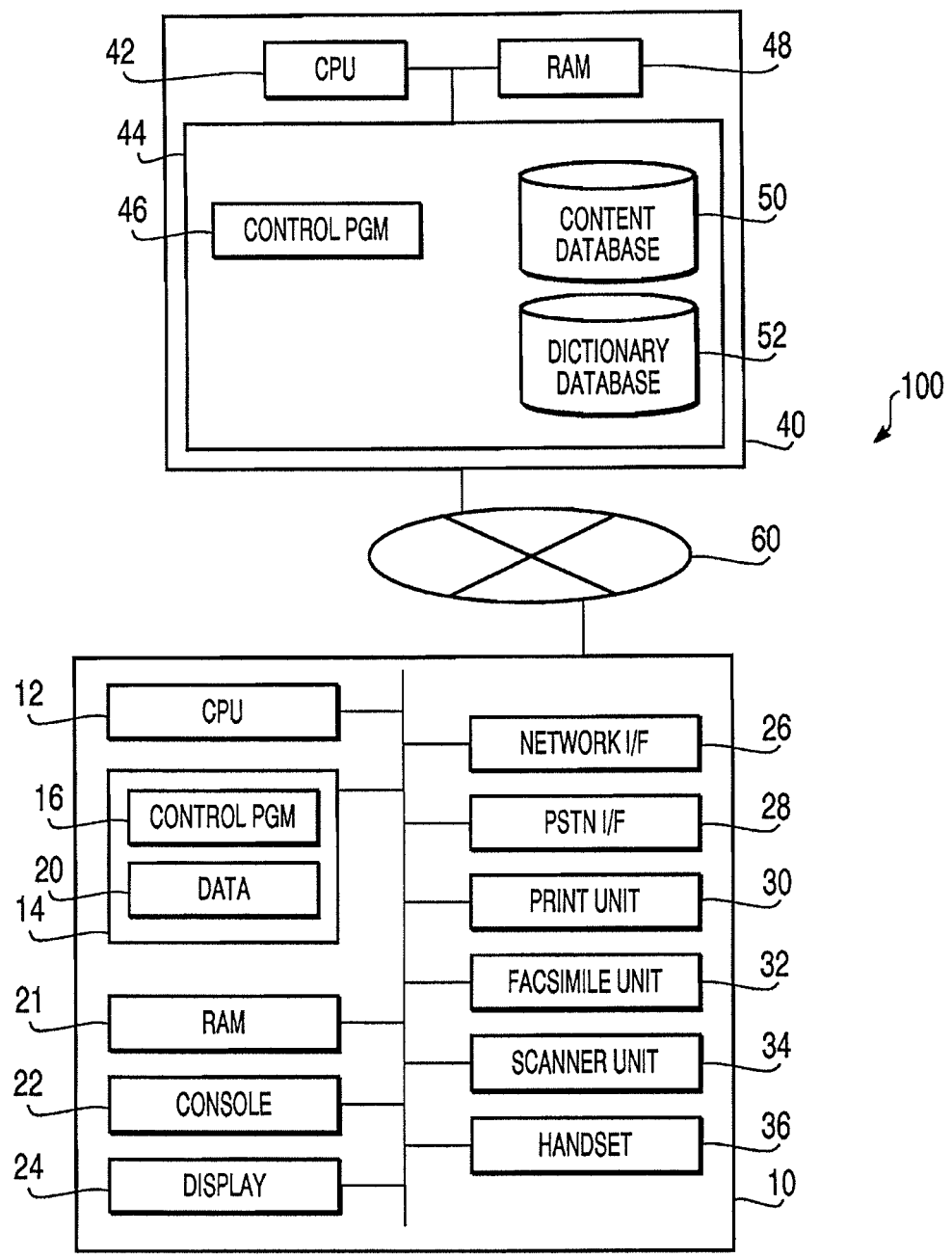
FIG. 1 illustrates a system configuration of an information processing system according to an embodiment.

FIG. 1 illustrates a system configuration of an information processing system 100 according to an embodiment. The information processing system 100 (hereafter, simply referred to as a system 100) includes a MFD (Multifunction Device) 10 and a server 40 which are communicatably connected with each other via a network 60. FIG. 1 also illustrates a block diagram of each of the MFD 10 and the server 40.

The MFD 10 has multiple functions including a telephone function, an image reading function, a facsimile function, a copy function and a print function. The MFD 10 includes a CPU 12, a storage unit 14, a RAM 21, a console 22, a display 24, a network interface (I/F) 26, a PSTN (Public Switched Telephone Network) interface (I/F) 28, a print unit 30, a facsimile unit 32, a scanner unit 34, and a handset 36. In FIG. 1, "I/F" means an interface, and "PGM" means a program.

The CPU 12 controls the MFD 10 in accordance with a control program 16 stored in the storage unit 14. The storage unit 14 further stores various types of data 20. The console 22 is a hardware unit configured to accept a user operation. That is, the console 22 accepts various types of user commands, such as a command for image reading.

The network interface 26 interfaces the MFD 10 with the network 60 to communicate with the server 40. The PSTN interface 28 interfaces the MFD 10 with a public network (not shown). The MFD 10 is able to transmit and receive facsimile data via the public network. The print unit 30 is a hardware unit having the print function. The facsimile unit 32 is a hardware unit having the facsimile function. The scanner unit 34 is a hardware unit having the scanner function (i.e., an image reading function). The handset 36 is a hardware unit which provided a function of voice communication with the party on the other end of the phone line. With this configuration, the MFD 10 is able to establish a telephone connection with a telephone (e.g., a device including a telephone function) on the other end via the public network or Internet.

The RAM 21 stores temporarily various types of data. The MFD 10 records data of a telephone communication, and stores recorded data in the RAM 21. The recorded data is then transmitted to the server 40.

As shown in FIG. 1, the server 40 includes a CPU 42, a storage unit 44 and a RAM 48. The storage unit 44 stores a control program 46, a content database 50 and a dictionary database 52 (i.e., a database storing a plurality of words).

Figure 2:
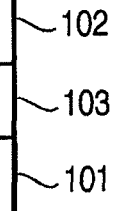
FIG. 2 illustrates an example of a data structure of a content database.

The system 100 is able to store data of a telephone communication recorded by the MFD 10, and register the recorded data in the content database 50 to manage the recorded data. FIG. 2 illustrates an example of a data structure of the content database 50. In the content database 50, a file of recorded data and a search keyword are stored while being associated with each other. In the following, data formed of a pair of the recorded data and the corresponding search keyword is referred to as a record. Each record is associated with an identification (ID). For example, in the record to which ID "001" is assigned, a file having a filename "xxx.xx" (recorded data) is associated with the search keyword "product planning". In the content database 50, a path name corresponding to the filename is also stored. The content database 50 shown in FIG. 2 indicates that the file having the filename "xxx.xx" is stored in a folder "folder 1". In the record to which ID "002" is assigned, a file having a filename "yyy.yy" (recorded data) is associated with the search keyword "planning meeting". In the record to which ID "003" is assigned, a file having a filename "zzz.zz" (recorded data) is associated with the search keyword "European standard". In the record to which ID "004" is assigned, a file having a filename "aaa.aa" (recorded data) is associated with the search keyword "unclassified". Each of the search keywords "product planning", "planning meeting" and "European standard" is designated by a user. The search keyword "unclassified" is automatically associated by the system 100. The system 100 automatically associates a predetermined search keyword "unclassified" with the recorded data to which no search keyword is assigned by the user, and records the recorded data and the search keyword "unclassified" in the content database 50.

The user is able to retrieve a desired file (recorded data) from the content database 50 by designating a search keyword. The system 100 registers the recorded data in association with a search keyword so as to easily manage a plurality of pieces of recorded data.

The system 100 is able to reduce the operating load on the user when the user assigns a keyword to the recorded data of a telephone communication.

Figure 3:
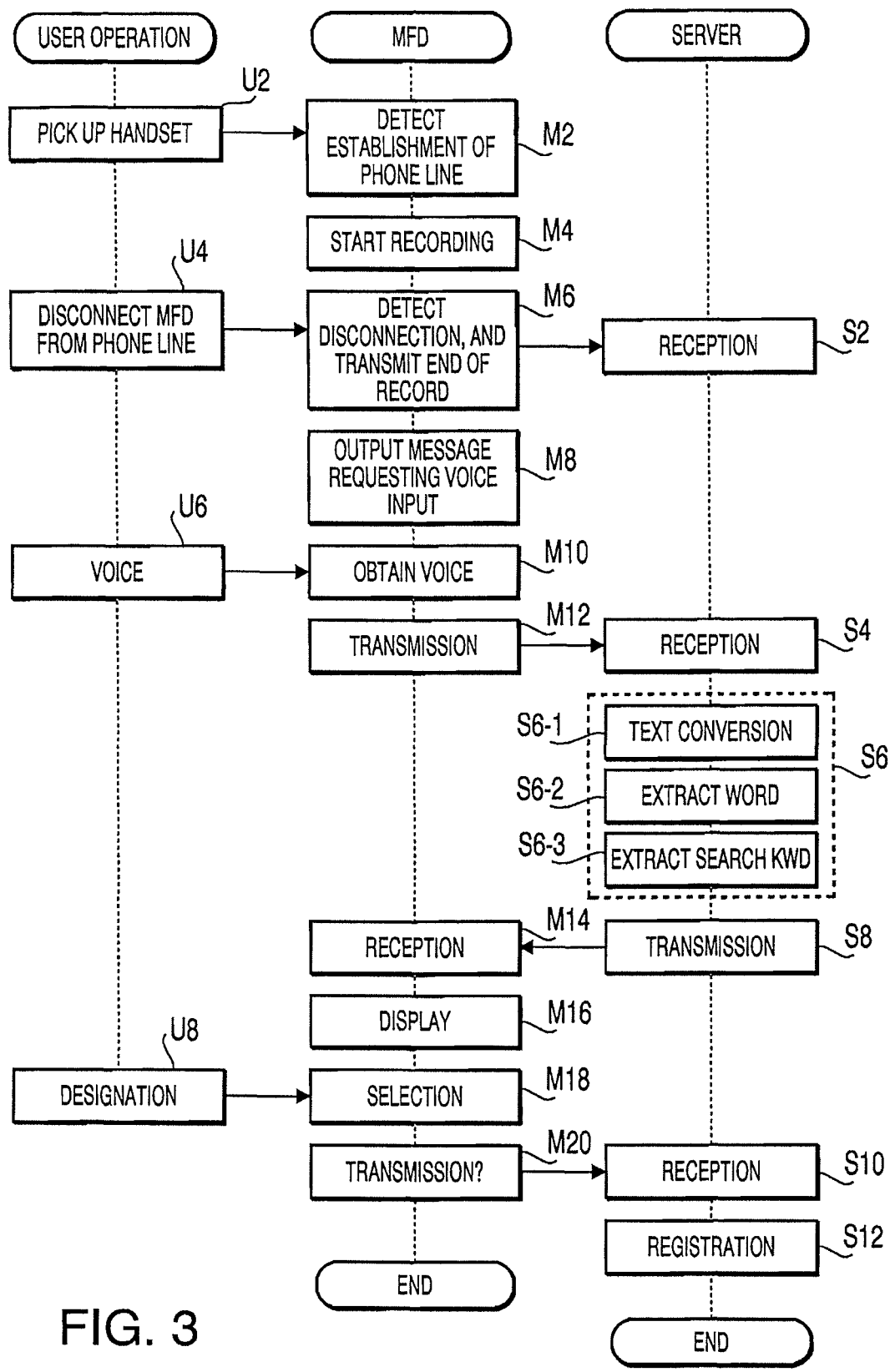
FIG. 3 is a flowchart illustrating processes executed on the system shown in FIG. 1.

FIG. 3 is a flowchart illustrating processes executed on the system 100. In FIG. 3, a user operation is illustrated on the left side, a process executed based on the control program 16 on the MFD 10 is illustrated in the center, and a process executed based on the control program 46 on the server 40 is illustrated in the right side. Although the process in FIG. 3 shows the process executed when the MFD 10 receives an incoming call, the same process may be executed when the MFD 10 starts a call for another telephone.

When the MFD 10 receives an incoming call from another telephone, the MFD 10 detects a user operation of picking up the handset 36 (U2). In this case, the MFD 10 judges that a phone line connection is established (M2). That is, the MFD 10 detects a closed state of the phone line. When the MFD 10 detects a closed state of the phone line, the MFD 10 starts recording a telephone communication (i.e., telephone conversation) (M4). When the user operates to disconnect from the phone line (U4), the MFD 10 detects disconnection from the phone line (M6). When the MFD 10 detects disconnection from the phone line, the MFD 10 terminates the recording and transmits the recorded data to the server 40 (M6). The server 40 receives the recorded data from the MFD 10, and stores the recorded data in a predetermined folder (S2). It should be noted that the user operation for disconnecting from the phone line includes an operation for pressing a stop button provided on the console 22 and a user operation for placing the handset 36 on the MFD 10.

The MFD 10 which has detected the disconnection from the phone line outputs a message for requesting the voice input through a speaker provided in the handset 36 (M8). That is, the MFD 10 outputs a message for requesting the user to conduct the voice input in response to detection of the disconnection from the phone line. The user produces a voice of a keyword which the user wants to associate with the recorded data in response to a request from the MFD 10 (U6). The MFD 10 obtains the voice which the user inputs to the MFD 10 through the microphone provided in the handset 36 (M10). That is, the MFD 10 obtains the voice produced by the user in response to detection of disconnection from the phone line.

The MFD 10 converts the obtained voice into digital data (voice data), and transmits the voice data to the serve r40 (M12). The server 40 receives the voice data from the MFD 10 (S4). Then, the server 40 generates keyword candidates based on the received voice data (S6). The keyword candidates are generated as follows. The server 40 converts the received voice data into text data (S6-1). The conversion into the text data may be executed in accordance with typical voice recognition technology. The server 40 extracts a word in the text data from the dictionary database 52 (S6-2). Next, the server 40 extracts a search keyword including the extracted word from the content database 50 (S6-3). In FIG. 3, "KWD" means a "keyword".

In step S6-1, there is a case where the server 40 extracts a plurality of words. In step S6-2, there is a case where the server 40 extracts a plurality of search keywords. An example of a process for generating search keywords is explained later.

The server 40 transmits the extracted search keywords to the MFD 10, as keyword candidates to be associated with the recorded data (S8).

The MFD 10 receives the keyword candidates from the server 40 (M14). The MFD 10 displays the received keyword candidates on the display 24 (M16). The user designates a desired keyword candidate to be associated with the recorded data from among the displayed keyword candidates through the microphone of the handset 36 (U8). The user is able to designate a plurality of keyword candidates. Further, when a desirable keyword is not displayed, the user is able to terminate the step without designating a keyword. The process executed by the MFD 10 in response to the user operation is explained later. It should be noted that designation of the keyword candidate may be conducted through the consoled 22.

The MFD 10 selects the keyword candidate designated by the user (M18). The MFD 10 transmits the selected keyword candidate to the server 40 (M20).

The server 40 receives the keyword candidate from the MFD 10 (S10). Then, the server 40 registers, as a search keyword, the received keyword candidate in the content database 50 while associating the received keyword candidate with the recorded data which has been received in step S2 (S12). In should be noted that the server 40 which has finished the registration, transmits a completion message to the MFD 10. In this case, the MFD 10 displays the completion message.

As described above, the system 100 executes the registration process in which the recorded data is registered in association with the search keyword, immediately after disconnection from the phone line. In this case, the user is only required to input a command to the MFD 10. In particular, the system 100 extracts past keywords each of which includes a word produced by the user from the content database 50, and displays the extracted keywords. The user is able to designate a keyword to be associated with new recorded data from among the past search keywords. That is, the user is able to designate a search keyword which has been associated with the past recorded data, as a search keyword to be associated with new recorded data.

Figure 4:
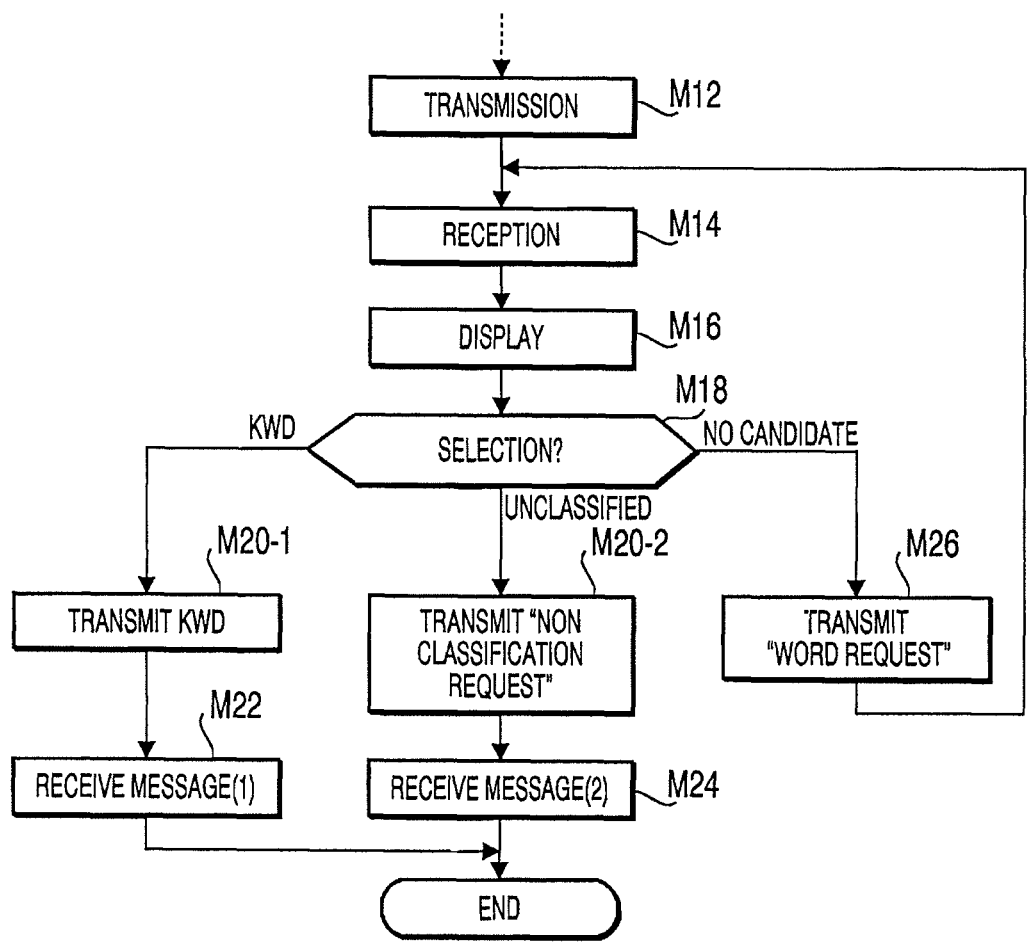
FIG. 4 illustrates a flowchart of the process of after step M12 in FIG. 3 executed on a multifunction device (MFD).

Hereafter, the process after step M12 executed on the MFD 10 and the process after step S4 executed on the server 40 are explained. FIG. 4 illustrates a flowchart of the process of after step M12 executed on the MFD 10. In FIG. 4, "KWD" means a keyword. In FIG. 4, steps M12 and M14 has been explained with reference to FIG. 3.

In step M16, the MFD 10 displays options "unclassified", "no candidate" and "voice re-input" as well as the received keyword candidates. The user designates a desired keyword candidate to be associated with the recorded data from among the displayed keyword candidates (U8 in FIG. 3). In this case (a branch "KWD" of step M18), the MFD 10 selects the keyword candidate designated by the user, and transmits the selected keyword candidate to the server 40 (M20-1). The server 40 receives the keyword candidate from the MFD 10, and registers the received keyword candidate in the content database 50 as a search keyword for the recorded data. The server 40 transmits a message indicating completion of the registration to the MFD 10. The MFD 10 receives the message from the server 40, and displays the received message (M22). The step M20-1 corresponds to the step M20 in FIG. 3.

When a desirable keyword candidate to be associated with the recorded data is not displayed, the user is able to designate one of "unclassified", "no candidate" and "voice re-input". When the user designates "unclassified" (a branch "unclassified" of M18), the MFD 10 transmits "a non-classification request" to the server 40 (M20-2). The server 40 executes a process corresponding to the non-classification request, and transmits a message indicating completion of the process to the MFD 10. The MFD 10 receives the message from the server 40, and displayed the received message (M24). The process corresponding to the "non-classification request" is explained later. It should be noted that the step M20-2 corresponds to the step M20 in FIG. 3.

When the user designates "no candidate" (a branch "no candidate" of M18), the MFD 10 transmits "a word request" to the serve 40 (M26). The server 40 which received the "word request" transmits the words extracted in step S6-2 (see FIG. 3) to the MFD 10. The MFD 10 receives the words from the server 40 (M14), and repeats steps from M16. When the user designates the "voice re-input", control returns to step M8 to continue the process.

Figure 5:
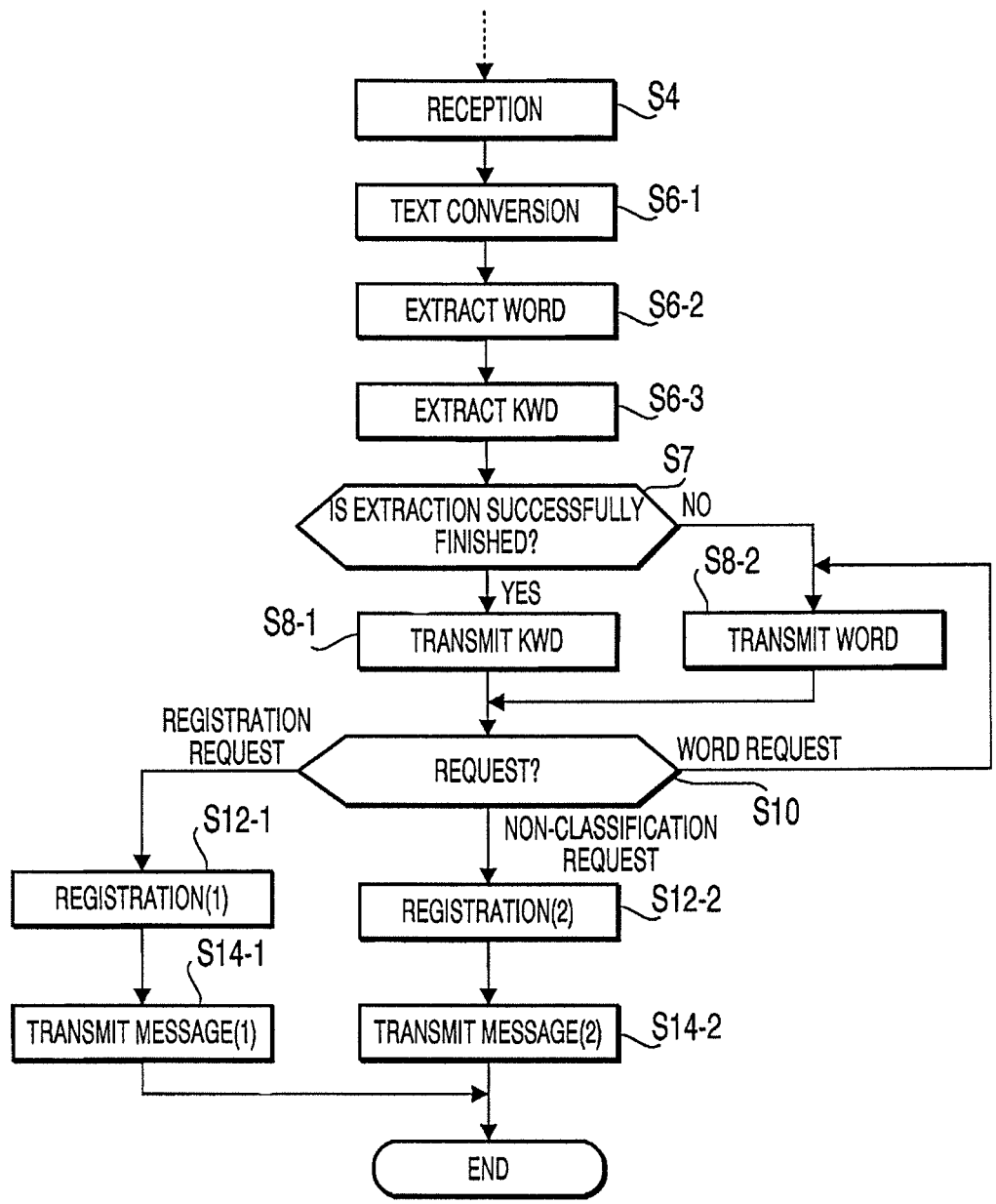
FIG. 5 illustrates a flowchart of a process from step S4 in FIG. 3 executed on a server.

FIG. 5 illustrates the process from step S4 executed on the server 40 (see FIG. 3). In FIG. 5, "KWD" means a keyword. The steps S4, S6-1, S6-2 and S6-3 have been explained.

If extraction of a keyword has been successfully finished in step S6-3 (S7: YES), the server 40 transmits the extracted keyword to the MFD 10, as a keyword candidate for new recorded data (S8-1). If the extraction of a keyword is not successful (S7: NO), i.e., a search keyword including the word extracted in step S6-2 is not found in the content database 50, the server 40 transmits the extracted word to the MFD 10, as a keyword candidate for the new recorded data (S8-2). The steps S8-1 and S8-2 correspond to the step S8 in FIG. 3.

Next, the server 40 receives a request from the MFD 10, and executes a process corresponding to the received request (S110). When the server 40 receives a keyword from the MFD 10, the server 40 judges that the server 40 receives "registration request" (a branch "registration request" of step S110. In this case, the server 40 registers the received keyword in the content database 50, as a search keyword for the recorded data (S12-1). Then, the server 40 transmits the message indicating completion of the registration process to the MFD 10 (S14-1). When the server 40 receives the "non-classification request" from the MFD 10 (a branch "non-classification request" of step S10), the server 40 registers the predetermined keyword "unclassifed" in the content database 50, as a keyword for the recorded data (S12-2). This step corresponds to step M20-2 in FIG. 4. Then, the server 40 transmits a message indicating completion of the registration process to the MFD 10 (S14-2). The record "004" to which the "unclassified" is assigned as the search keyword in the content database shown in FIG. 2 corresponds to the result of the above described step S12-2. The steps S12-1 and S12-2 correspond to step S12 in FIG. 3.

When the server 40 receives the "word request" from the MFD 10 (a branch "word request" of step S10), the server 40 transmits the word extracted in step S6-2 to the MFD 10, as a keyword candidate (S8-2). Then, the server 40 moves a state of waiting for a request from the MFD 10 (step S10).

An example of a generation process of a keyword will now be explained with reference to FIG. 2. If the voice produced by the user has Japanese pronunciation "kikaku" (which means "planning" in English), the server 40 extracts words having the similar pronunciation as "kikaku" from the dictionary database 52. In this case, four words "kikaku" in Japanese hiragana character, "kikaku" in Japanese katanaka character, "kikaku" in kanji character (1) (which means "standard" in English) and "kikaku" in kanji character (2) (which means "planning" in English) are extracted (S6-2) (see below indicated Table 1).

TABLE 1

| words extracted from voice having pronunciation "kikaku" | Japanese character type |
| --- | --- |
| きかく | hiragana |
| キカク | katakana |
| 規格 | kanji-(1) having pronunciation "kikaku" |
| 企画 | kanji-(2) having pronunciation "kikaku" |

Next, the server 40 extracts a search keyword including one of the four extracted words from the content database 50. In this case, as shown in FIG. 2, the search keywords 101, 102, 103 having the pronunciation "ohshu-kikaku" (European Standard), "shohin-kikaku" (product planning), and "kikaku-kaigi" (planning meeting) are extracted (S6-3) (see below indicated Table 2). In S8-1, the server 40 transmits the three search keywords 101-103 to the MFD 10. On the other hand, in step S8-2, the server 40 transmits the four words "kikaku" in hiragana character, "kikaku" in katanaka character, "kikaku" in kanji character (1) and "kikaku" in kanji character (2) to the MFD 10 as keyword candidates.

TABLE 2

| extracted search keyword (Japanese Kanji Character) | pronunciation |
| --- | --- |
| 101:欧州規格 | ohshu-kikaku |
| 102:商品企画 | shohin-kikaku |
| 103:企画会議 | kikaku-kaigi |

Regarding an example of the generation process of a keyword conducted in English language, the process is executed as follows, for example. If voice inputted by the user is "plan", the server 40 extracts words "plan" and "planning" from the dictionary database. Then, the server 40 extracts search keywords "product planning" and "planning meeting" from the content database, as keyword candidates to be transmitted to the MFD 10.

As described above, the server 40 is configured to register in advance the search keyword "unclassified" so as to discriminate the recorded data to which the desired search keyword has been assigned by the user from the recorded data to which no search keyword has been assigned. In the following, a process for associating a desirable search keyword to the recorded data to which the search keyword "unclassified" is assigned is explained. In the following, the recorded data to which the search keyword "unclassified" is called "unclassified data".

Figure 6:
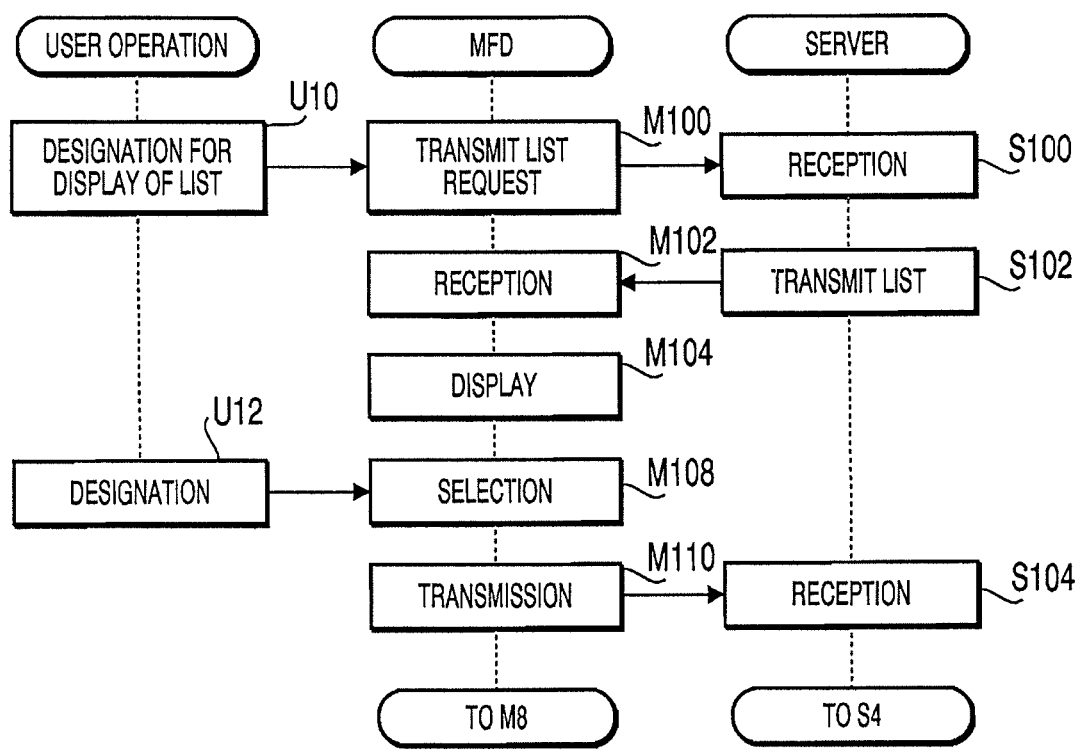
FIG. 6 illustrates a flowchart concerning processes executed on the MFD and the server for processing "unclassified data".

FIG. 6 illustrates a flowchart concerning processes executed on the MFD 10 and the server 40 for processing the "unclassified data".

First, the user inputs a command for displaying a list of the unclassified data to the MFD 10 (U10). When the MFD 10 receives the command input by the user, the MFD 10 transmits a "list request" for unclassified data to the server 40 (M100). The server 40 receives the list request from the MFD 10 (S100). The server 40 which has received the list request extracts recorded data associated with the search keyword "unclassified" (i.e., the unclassified data) from the content database 50, and transmits the list of the extracted data (unclassified data) to the MFD 10 (S102). The MFD 10 receives the list from the server 40 (M102). Then, the MFD 10 displays the received list (M104).

Next, the user designates desired unclassified data for which the user wants to register a search keyword (U12). The MFD 10 selects the unclassified data designated by the user (M108). Then, the MFD 10 transmits the designated unclassified data to the server 40 (M110). The server 40 receives the unclassified data from the MFD 10 (S104). Thus, the MFD 10 and the server 40 are able to specify the unclassified data to which the user wants to assign a search keyword. Subsequently, the process on the MFD 10 proceeds to step M8 (se FIG. 3), and the process on the server 40 proceeds to step S4 (see FIG. 3).

Although the present invention has been described in considerable detail with reference to certain preferred embodiments thereof, other embodiments are possible.

The process on the MFD 10 is executed in accordance with the control program 16. That is, the MFD 10 has the following technical features:

a recording unit configured to record telephone communication conducted through the telephone function;

a voice obtaining unit configured to obtain voice externally in response to detection of disconnection from a phone line;

a first transmission unit configured to transmit recorded data which is recorded by the recording unit, to the terminal;

a second transmission unit configured to transmit voice data obtained by the voice obtaining unit to the terminal;

a device side reception unit configured to receive keyword candidate data from the terminal;

a display control unit configured to display the received keyword candidate data;

a selection unit configured to select at least one keyword candidate from among the displayed keyword candidate data; and a third transmission unit configured to transmit the selected at least one keyword candidate to the terminal.

The process on the server 40 is executed in accordance with the control program 46. That is, the sever 40 has the following features.

a keyword generation unit configured to generate the keyword candidate data based on the voice data received from the device;

a terminal side transmission unit configured to transmit the generated keyword candidate data to the device; and a registration unit configured to register the at least one keyword candidate received from the device in a content database as a search keyword for searching for the recorded data while associating the received at least one keyword candidate with the recorded data in the content database.

In step S8 of FIG. 3, the server 40 may transmit the words extracted from the dictionary database 52, together with the search keyword extracted from the content database 50. In this case, the MFD 10 which has received the keyword candidates may display preferentially the search keyword, for example, in the upper area of the display 24 and display the words extracted from the dictionary database 52 in a lower priority, for example, in a lower area of the display 24.

The server 40 may store the recorded data to which the "unclassified" is assigned in the storage unit 44 such that the recorded data to which the "unclassified" is assigned is discriminated from the past recorded data to which the search keyword is assigned.

Each of the search keyword and the keyword candidate may be a character string including a plurality of words. That is, the information processing system may extract the character string including the word extracted from the dictionary database 52, and employ the extracted character string as the keyword candidate.

The process executed on the server 40 in the above described embodiment may be executed o the MFD 10. That is, all the processes shown in FIGS. 3 to 5 may be executed on the MFD 10.

The handset may be constituted by a speaker and a microphone provided in a device (e.g., the MFD 10). The MFD 10 may be present a message to the user through the display and accept the user command through the console. However, the MFD 10 may use the handset as a man machine interface.

The MFD may have the following features:

a speaker and a microphone for a telephone communication with a party on the other side;

a recording unit configured to record the telephone communication;

a message output unit configured to output a message for requesting a user to conduct voice input in response to detection of disconnection from the phone line;

a voice obtaining unit configured to obtain voice produced by the user through the microphone; and the above described first transmission unit, the second transmission unit, the reception unit, the display control unit, the selection unit, and the third transmission unit.

By noting that the user uses the microphone to conduct a telephone communication, the MFD having the above described features is configured to use the microphone to obtain voice for generating the keyword candidate.

In order to terminate the telephone communication (i.e., to disconnect from the phone line), the user may place the handset in place of pressing the stop button. Therefore, if the handset is used as a man machine interface, the system 100 may executes the following process.

The process described below can be understood easily by referring to the process shown in FIG. 3.

When the user presses the stop button (U4), the MFD 10 adds a flag indicating immediate execution of the keyword registration process to the recorded data, and transmits the recorded data to the server 40 (M6). The server 40 receives the recorded data to which the flag is added (S2). The server 40 moves to a waiting state of waiting for transmission (M12) of the voice data from the MFD 10 in response to the fact that the flag is added to the received recorded data. The server 40 which has received the voice data executes steps S6 and S8, and moves to a waiting state of waiting for transmission (M20) of the keyword candidate from the MFD 10. The server 40 which has received the keyword candidate executes step S12. In step S12, the server 40 deletes the flag added to the recorded data.

On the other hand, when the user disconnects the MFD 10 from the phone line by placing the handset in place of pressing the stop button, the MFD 10 transmits the recorded data to the server 40 without adding the above described flag to the recorded data. (M6). The server 40 registers the recorded data in the content database in association with the keyword "unclassified" without moving to the waiting state of waiting for transmission of the voice data or the keyword candidate.

That is, if the MFD 10 is disconnected from the phone line by the user operation of pressing the stop button, the system 100 executes the registration process for registering desired keyword in accordance with the voice input conducted by the user. On the other hand, if the user disconnects the MFD 10 from the phone line by placing the handset in place of pressing the stop button, the system automatically executes the predetermined process for registering the predetermined keyword without moving to the waiting state of waiting for the voice input from the user.

It is understood that various types of variations of the embodiment can be achieved by constituting various types of combinations regarding the above described features.

What is claimed is:

1. An information processing system, comprising:
   a communication device having a telephone function; and
   a terminal device communicably connected to the communication device, the communication device comprising:
      a recording device configured to record telephone communication conducted through the telephone function when the device is connected to a phone line;
      a disconnection judging device configured to judge whether the communication device connected to the phone line is disconnected from the phone line;
      a control device configured to execute a keyword display process in response to detection by the disconnection judging device that the communication device is disconnected from the phone line;
      the keyword display process comprising:
         prompting a user to input voice externally into the communication device;
         generating voice data from the voice externally input by the user;
         transmitting recorded data which is recorded by the recording device to the terminal device;
         transmitting the voice data inputted in response to the disconnection of the communication device from the phone line;
         receiving keyword candidate data from the terminal device; and
         displaying the received keyword candidate data on a display as one or more candidate search keywords;
      a selection device configured to receive input from the user to select at least one of the one or more candidate search keywords that are displayed as the keyword candidate data; and
      a transmission device configured to transmit the at least one keyword candidate selected through the selection device to the terminal device, the terminal device comprising:
         a first terminal side reception device configured to receive the recorded data from the communication device;
         a content database configured to store the recorded data received from the communication device, the content database comprising a plurality of search keywords associated with previously received recorded data;
         a keyword generation device configured to generate the keyword candidate data by extracting the one or more candidate search keywords from the plurality of search keywords in the content database based on the voice data received from the communication device;
         a terminal side transmission device configured to transmit the generated keyword candidate data to the communication device;
         a second terminal side reception device configured to receive the at least one keyword candidate selected by the selection device and transmitted from the communication device; and
         a registration device configured to register the at least one keyword candidate received from the communication device in the content database as a search keyword for searching for the recorded data while associating the received at least one keyword candidate with the recorded data in the content database.

2. The information processing system according to claim 1, wherein the terminal device comprises a predetermined database stored in the memory and storing a plurality of words, wherein the keyword generation device is configured to:
   extract a word contained in the voice data from the predetermined database;
   extract the one or more candidate search keywords from the content database when one or more of the plurality of search keywords in content database include the extracted word; and
   adopt the one or more extracted candidate search keywords as the keyword candidate data to be transmitted to the communication device.

3. The information processing system according to claim 2, wherein the keyword generation device is further configured to adopt the word extracted from the predetermined database as the keyword candidate data when none of the plurality of search keywords in the content database includes the word extracted from the predetermined database.

4. The information processing system according to claim 2, wherein the keyword generation device is further configured to adopt the word extracted from the predetermined database as well as the one or more extracted candidate search keywords as the keyword candidate data to be transmitted to the communication device.

5. The information processing system according to claim 1, wherein the registration device is configured to register a predetermined keyword in the content database as the search keyword of for searching the recorded data when no keyword candidate is selected through the selection device.

6. The information processing system according to claim 1, wherein:
   the terminal device further comprises a storage device configured such that, when no keyword candidate is selected through the selection device, the storage device stores the recorded data for which no keyword candidate is selected while distinguishing the recorded data for which no keyword candidate is selected from the recorded data to which the search keyword has been assigned;
   the communication device further comprises a list display control unit configured to display a list of the recorded data for which no search keyword is registered on the display;
   the selection device selects a piece of recorded data from among the displayed list; and the registration device registers a selected keyword selected through the selection device in the content database, as the search keyword for the piece of recorded data selected through the selection device.

7. An information processing system, comprising:
a communication device having a telephone function, the communication device comprising:
a recording device configured to record telephone communication conducted through the telephone function when the communication device is connected to a phone line;
a disconnection judging device configured to judge whether the communication device connected to the phone line is disconnected from the phone line;
a control device configured to execute a keyword display process in response to detection by the disconnection judging device that the communication device is disconnected from the phone line;
the keyword display process comprising:
prompting a user to input voice externally into the communication device;
generating voice data from the voice externally input by the user;
transmitting recorded data which is recorded by the recording device;
transmitting the voice data inputted in response to the disconnection of the communication device from the phone line;
receiving keyword candidate data; and
displaying the received keyword candidate data on a display as one or more candidate search keywords;
a selection device configured to receive input from the user to select at least one of the one or more candidate search keywords that are displayed as the keyword candidate data; and
a transmission device configured to transmit the at least one keyword candidates selected through the selection device,
a first target side reception device configured to receive the recorded data from the communication device;
a content database configured to store the recorded data received from the communication device, the content database comprising a plurality of search keywords associated with previously received recorded data;
a keyword generation device configured to generate the keyword candidate data by extracting the one or more candidate search keywords from the plurality of search keywords in the content database based on the voice data received from the communication device;
a target side transmission unit configured to transmit the generated keyword candidate data to the communication device;
a second target side reception device configured to receive the at least one keyword candidate selected by the selection device and transmitted from communication device; and
a registration device configured to register the at least one keyword candidate received from the communication device in the content database as a search keyword for searching for the recorded data while associating the received at least one keyword candidate with the recorded data in the content database.

8. The information processing system according to claim 7, further comprising a first terminal and a second terminal, wherein:
the target side reception device and the registration device are provided in the first terminal; and
the keyword generation device and the target side transmission device are provided in the second terminal.

9. The information processing system according to claim 7, further comprising a terminal communicably connected to the communication device, wherein:
the target side reception device and the registration device are provided in the terminal; and
the keyword generation device and the target side transmission device are provided in the communication device.

10. An information processing device having a telephone function, comprising:
a recording device configured to record telephone communication conducted through the telephone function when the information processing device is connected to a phone line;
a disconnection judging device configured to judge whether the information processing device connected to the phone line is disconnected from the phone line;
a control device configured to execute a keyword display process in response to detection by the disconnection judging device that the information processing device is disconnected from the phone line, the keyword display process comprising:
prompting a user to input voice externally into the information processing device;
generating voice data from the voice externally input by the user;
receiving keyword candidate data that was generated by extracting, based on the voice data, one or more candidate search keywords from a plurality of search keywords that are associated with previously received recorded data; and
displaying the one or more candidate search keywords as the keyword candidate data;
a selection device configured to receive input from the user to select at least one of the one or more candidate keywords that are displayed as the keyword candidate data; and
a registration device configured to register the at least one keyword candidate selected through the selection device in a content database stored in a memory as a search keyword for searching for the recorded data while associating the at least one keyword candidate with the recorded data in the content database.

11. A method to be implemented on an information processing device having a telephone function, comprising the steps of:
storing a plurality of search keywords in a content database, the plurality of keywords being associated with previously recorded data;
recording telephone communication conducted through the telephone function as currently recorded data when the information processing device is connected to a phone line;
judging whether the information processing device connected to the phone line is disconnected from the phone line;
prompting a user to input voice externally into the information processing device when it is judged that the information processing device is disconnected from the phone line;
receiving voice externally into the information processing device;
generating voice data from the voice received externally from the user;

generating keyword candidate data by extracting one or more candidate search keywords from the plurality of search keywords in the content database based on the voice data;

displaying the one or more candidate search keywords as the keyword candidate data;

receiving input from the user to select at least one of the one or more candidate search keywords that are displayed as the keyword candidate data; and registering the selected at least one keyword candidate in the content database as a search keyword for searching for the currently recorded data while associating the at least one keyword candidate with the currently recorded data in the content database.

12. A non-transitory computer readable medium having computer readable instruction stored thereon, which, when executed by a processor of an information processing device having a telephone function, configures the processor to perform the steps of:

storing a plurality of search keywords in a content database, the plurality of keywords being associated with previously recorded data;

recording telephone communication conducted through the telephone function as currently recorded data when the information processing device is connected to a phone line;

judging whether the information processing device connected to the phone line is disconnected from the phone line;

prompting a user to input voice externally into the information processing device if it is judged that the information processing device is disconnected from the phone line;

receiving voice externally into the information processing device;

generating voice data from the voice received externally from the user;

generating keyword candidate data by extracting one or more candidate search keywords from the plurality of search keywords in the content database based on the voice data;

displaying the one or more candidate search keywords as the keyword candidate data;

receiving input from the user to select the at least one of the one or more candidate search keywords that are displayed as the keyword candidate data; and registering the selected at least one keyword candidate in the content database as a search keyword for searching for the currently recorded data while associating the at least one keyword candidate with the currently recorded data in the content database.

13. The information processing system according to claim 1, further comprising a judging device configured to judge whether the one or more candidate search keywords is among the plurality of search keywords in content database, wherein the keyword generation device is further configured to:

generate keyword candidate data by extracting one or more candidate search keywords that include a word extracted from the voice data when the judging device judges that the word extracted from the voice data is registered in the content database; and generate keyword candidate data by utilizing the word extracted from the voice data as the one or more candidate search keywords when the judging device judges that the word extracted from the voice data is not registered in the content database.

* * * * *